United States Patent
Hsieh et al.

(10) Patent No.: US 7,701,183 B2
(45) Date of Patent: Apr. 20, 2010

(54) POWER CIRCUIT AND CHARGE PUMPING CIRCUIT

(75) Inventors: Chih-Yuan Hsieh, Hsinchu (TW); Jiunn-Way Miaw, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 399 days.

(21) Appl. No.: 11/866,739

(22) Filed: Oct. 3, 2007

(65) Prior Publication Data

US 2008/0143308 A1    Jun. 19, 2008

(30) Foreign Application Priority Data

Dec. 14, 2006    (TW) ............................... 95146845 A

(51) Int. Cl.
  *G05F 1/40*    (2006.01)
  *G05F 3/02*    (2006.01)
(52) U.S. Cl. .................. 323/273; 323/280; 327/536
(58) Field of Classification Search ......... 323/273–280; 327/536
See application file for complete search history.

(56) References Cited

U.S. PATENT DOCUMENTS

| | | | | |
|---|---|---|---|---|
| 6,646,495 B2 * | 11/2003 | Perez | ........................... | 327/541 |
| 7,091,709 B2 * | 8/2006 | Suzuki | ........................ | 323/281 |
| 7,362,080 B2 * | 4/2008 | Sohn et al. | .................... | 323/277 |
| 7,405,547 B2 * | 7/2008 | Kanzaki | ...................... | 323/277 |
| 2007/0057655 A1 * | 3/2007 | Nishida | ........................ | 323/282 |

* cited by examiner

*Primary Examiner*—Jessica Han
(74) *Attorney, Agent, or Firm*—J.C. Patents

(57) ABSTRACT

A power circuit and a charge pumping circuit add one control switch of small size to control a power transistor, and save one switch of large area and one capacitor of large area as compared with a conventional power circuit and a conventional charge pumping circuit. The power circuit includes a power processing circuit, a linear voltage-regulating switch, and a capacitor. The linear voltage-regulating switch includes a power transistor and a control switch. The control switch has a first end coupled to a gate of the power transistor and a second end coupled to one of a drain and a source of the power transistor. When the control switch is "on", the power transistor is "off". When the control switch is "off", the voltage on the drain of the power transistor is maintained at a predetermined value by the linear voltage-regulating switch.

21 Claims, 11 Drawing Sheets

POWER CIRCUIT AND CHARGE PUMPING CIRCUIT

CROSS-REFERENCE TO RELATED APPLICATION

This application claims the priority benefit of Taiwan application serial no. 95146845, filed Dec. 14, 2006. All disclosure of the Taiwan application is incorporated herein by reference.

BACKGROUND OF THE INVENTION

1. Field of the Invention

The present invention relates to a circuit of processing and providing electric power. More particularly, the present invention relates to a power circuit and a charge pumping circuit.

2. Description of Related Art

Conventional power circuits have a defect that when an output end has a load current, a voltage drop occurs, which is caused by an equivalent resistance of a switch in the power circuit when the load current passes through. Here, the output voltage is lower than an object voltage, and the differential value differs as different load currents and switch resistances.

Under the requirement for the application of voltage with high stability and high precision, a linear voltage regulator of low voltage drop is generally used at an output end of a power circuit so as to stabilize the output voltage. However, it is disadvantageous that the output capacitance of one linear voltage regulator is added. The capacitance usually occupies a larger area in an integrated circuit, and even an external device must be used, such that the cost is increased. In a multi-power system, the cost waste is more obvious.

FIGS. 1a and 1b show power circuits according to a conventional art. The power circuit in FIG. 1a performs a voltage transformation first, and then performs a voltage regulation. As shown in FIG. 1a, the power circuit 100a includes a power processing circuit 102a, a switch 104a, a first capacitor 106a, a linear voltage regulator 108a, and a second capacitor 116a. The power processing circuit 102a has a first end and a second end. The first end of the power processing circuit 102a is connected to an input voltage, and the voltage is output from the second end after being processed by the power processing circuit 102a. Thus, the voltage characteristics (e.g. voltage magnitude, duty cycle, and so on) of the voltage on the first end and the second end are different. The voltage output by the second end is controlled to be "on" or "off" by the switch 104a. Then, the output voltage is stabilized by the first capacitor 106a and then adjusted by the linear voltage regulator 108, and is stabilized by the second capacitor 116a again. Finally, the required output voltage is obtained.

The power circuit of FIG. 1b performs the voltage regulation first, and then performs the voltage transformation process. As shown in FIG. 1b, the power circuit 100b includes a linear voltage regulator 108b, a first capacitor 106b, a switch 104b, a power processing circuit 102b, and a second capacitor 116b. The linear voltage regulator 108b adjusts the power voltage first, and then maintains the output voltage at a certain predetermined value, and the output voltage is stabilized by the first capacitor 106b. Then, the switch 104b controls whether to turn on or off the output voltage to the power processing circuit 102b. The power processing circuit 102b has a first end and a second end, in which the voltage of the first end is processed by the power processing circuit 102b and then output from the second end. Thus, the voltage characteristics of the voltage on the first end and the second end of the power processing circuit 102b are different. The power processing circuit 102b can further have a third end, for example, coupled to an input voltage. The power processing circuit 102b changes the voltage on the first end of the power processing circuit 102b according to the input voltage, so as to obtain the voltage on the second end of the power processing circuit 102b. The voltage output from the second end is stabilized by the second capacitor 116b again, and finally the required output voltage is obtained.

FIGS. 2a and 2b show double charge pumping circuit corresponding to FIGS. 1a and 1b of the conventional art respectively.

The double charge pumping circuit in FIG. 2a firstly performs a double voltage transformation, and then performs the voltage regulation process. As shown in FIG. 2a, the components are approximately the same as those of FIG. 1a, so the same components will not be described herein again. The power processing circuit 102a includes a first switch 202a, a second switch 204a, a capacitor 206a, and a third switch 208a. The first switch 202a and the third switch 208a in the power processing circuit 102a are "on" in a phase 1, and the second switch 204a and the switch 104a are "on" in a phase 2. The "on time" controlled by the phase 1 and the phase 2 is different. Thus, the voltage transformation process is performed on the input voltage Vx (Vx>Vin) connected to the first switch 202a. In the phase 1, the Vx voltage is obtained at the output of the power processing circuit 102a, and in the phase 2, a 2Vx voltage is obtained. Therefore, a relative stable 2Vx voltage can be obtained through the switch 104a and the first capacitor 106a, and then the linear voltage regulator 108a and the second capacitor 116a perform the voltage adjustment and stabilization. Finally, the 2Vin output voltage is obtained.

The double charge pumping circuit in FIG. 2b firstly performs the voltage regulation and then performs the double voltage transformation process. As shown in FIG. 2b, the components are approximately same as those of FIG. 1b, so the same components will not be described herein again. The power processing circuit 102b includes a second switch 204b, a second capacitor 206b, a third switch 208b, and a fourth switch 210b. A stable Vin voltage is obtained through the linear voltage regulator 108b and the first capacitor 106b. The switch 104b and the third switch 208b in the power processing circuit 102b are used together and are "on" in the phase 1, and the second switch 204b and the fourth switch 210b are "on" in the phase 2. The "on time" controlled by the phase 1 and the phase 2 is different. Therefore, a 2Vin voltage is obtained at the output of the power processing circuit 102b, and is stabilized by the second capacitor 116b. Finally, the stable 2Vin output voltage is obtained.

FIG. 3 shows a negative-voltage charge pumping circuit according to the conventional art. The circuit performs the voltage transformation process first and then performs the voltage regulation. As shown in FIG. 3, the negative-voltage charge pumping circuit 300 includes a first switch 302, a second switch 304, a first capacitor 306, a third switch 308, a fourth switch 310, a second capacitor 312, a linear voltage regulator 314, and a third capacitor 322. The first switch 302, the second switch 304, the first capacitor 306, and the third switch 308 forms a negative-voltage generating circuit (corresponding to the power processing circuit in FIG. 2a). The action principle of the circuit in FIG. 3 is approximately the same as that of FIG. 2a, so the details will not be described herein again. When the circuit enters the phase 1, the first switch 302 and the second switch 304 are "on", the input voltage charges the first capacitor 306 until the voltage becomes Vx, and the third switch 308 and the fourth switch

310 are "off". When the circuit enters the phase 2, the third switch 308 and the fourth switch 310 are "on", the first switch 302 and the second switch 304 are "off", and the voltage is changed to be −Vx. Therefore, the output voltage can be maintained at a predetermined value −Vin by the linear voltage regulator 314 and the third capacitor 322.

The power circuit of the present invention modifies the above disadvantages.

SUMMARY OF THE INVENTION

Accordingly, the present invention is directed to a power circuit. In the power circuit, a power is processed first, and then a voltage regulation is performed. Compared with the conventional power circuit, the present invention saves one switch of large area and one capacitor of large area, and adds one control switch of a small size to control a power transistor.

The present invention is also directed to a power circuit. In the power circuit, the voltage regulation is performed first, and then the power is processed. Compared with the conventional power circuit, the present invention adds one control switch to control the power transistor, and saves one switch of large area and one capacitor of large area.

The present invention is further directed to a charge pumping circuit. In the charge pumping circuit, a voltage transformation is performed first, and then the voltage regulation is performed. Compared with the conventional charge pumping circuit, the present invention saves one switch of large area and one capacitor of large area, and adds one control switch of a small size to control the power transistor.

The present invention is also directed to a charge pumping circuit. In the charge pumping circuit, the voltage regulation is performed first, and then the voltage transformation is performed. Compared with the conventional charge pumping circuit, the present invention adds one control switch to control the power transistor, and saves one switch of large area and one capacitor of large area.

A power circuit including a power processing circuit, a linear voltage-regulating switch, and a capacitor is provided. The power processing circuit has a first end coupled to an input voltage and a second end. The voltages on the first end and the second end of the power processing circuit have different voltage characteristics. The linear voltage-regulating switch includes a power transistor and a control switch. The power transistor has a source coupled to the second end of the power processing circuit, a gate, and a drain. The control switch has a first end coupled to the gate of the power transistor and a second end coupled to the drain or the source of the power transistor. When the control switch is "on", the power transistor is "off", and when the control switch is "off", the voltage on the drain of the power transistor is maintained at a predetermined value by the linear voltage-regulating switch. The capacitor has a first end coupled to the drain of the power transistor and a second end grounded. An output voltage is obtained from the first end of the capacitor.

In the power circuit according to an embodiment of the present invention, the linear voltage-regulating switch further includes an amplifier. The amplifier has a first input end coupled to a feedback voltage, a second input end inputting a reference voltage, and an output end coupled to the gate of the power transistor. The amplifier compares the feedback voltage and the reference voltage to control the gate of the power transistor, so as to maintain the voltage on the drain of the power transistor at the predetermined value. The feedback voltage is equal to the voltage on the drain of the power transistor multiplied by a feedback ratio. When the power transistor is a P-type transistor, the first input end of the amplifier is a positive-phase input end, and the second input end is a negative-phase input end. When the power transistor is an N-type transistor, the first input end of the amplifier is a negative-phase input end, and the second input end is a positive-phase input end.

In the power circuit according to an embodiment of the present invention, the linear voltage-regulating switch further includes a plurality of resistors connected in series, having one end coupled to the drain of the power transistor and the other end grounded. The feedback voltage is obtained from any serial connection point of the resistors.

The power circuit according to an embodiment of the present invention is applicable to the multi-power system.

A power circuit including a linear voltage-regulating switch, a power processing circuit, and a capacitor is provided. The linear voltage-regulating switch includes a power transistor and a control switch. The power transistor has a source coupled to a power voltage, a gate, and a drain. The control switch has a first end coupled to the gate of the power transistor and a second end coupled to the drain or the source of the power transistor. When the control switch is "on", the power transistor is "off", and when the control switch is "off", the voltage on the drain of the power transistor is maintained at a predetermined value by the linear voltage-regulating switch. The power processing circuit has a first end coupled to the drain of the power transistor and a second end, in which the voltages on the first end and the second end of the power processing circuit have different voltage characteristics. The capacitor has a first end coupled to the second end of the power processing circuit and a second end grounded. An output voltage is obtained from the first end of the capacitor.

In the power circuit according to an embodiment of the present invention, the power processing circuit further has a third end coupled to an input voltage. The power processing circuit changes a voltage on the first end of the power processing circuit according to the input voltage, so as to obtain a voltage on the second end of the power processing circuit.

In the power circuit according to an embodiment of the present invention, the linear voltage-regulating switch further includes an amplifier. The amplifier has a first input end coupled to a feedback voltage, a second input end inputting a reference voltage, and an output end coupled to the gate of the power transistor. The amplifier compares the feedback voltage and the reference voltage to control the gate of the power transistor, so as to maintain the voltage on the drain of the power transistor at the predetermined value. The feedback voltage is equal to the voltage on the drain of the power transistor multiplied by a feedback ratio. When the power transistor is a P-type transistor, the first input end of the amplifier is a positive-phase input end, and the second input end is a negative-phase input end. When the power transistor is an N-type transistor, the first input end of the amplifier is a negative-phase input end, and the second input end is a positive-phase input end.

In the power circuit according to an embodiment of the present invention, the linear voltage-regulating switch further includes a plurality of resistors connected in series, having one end coupled to the drain of the power transistor and the other end grounded. The feedback voltage is obtained from any serial connection point of the resistors.

The power circuit according to an embodiment of the present invention is applicable to the multi-power system.

A charge pumping circuit including a first switch, a second switch, a first capacitor, a third switch, a linear voltage-regulating switch, and a second capacitor is provided. The first switch has a first end coupled to an input voltage and a second end. The first switch is "on" in the first phase (i.e. phase 1), and "off" in the second phase (i.e. phase 2). The second switch has a first end coupled to the input voltage and a second end. The second switch is "off" in the first phase, and "on" in the second phase. The first capacitor has a first end coupled to the second end of the first switch and a second end coupled to the second end of the second switch. The third switch has a first end coupled to the second end of the first capacitor and a second end grounded. The third switch is "on" in the first phase, and "off" in the second phase. The linear voltage-regulating switch includes a power transistor and a control switch. The power transistor has a source coupled to the first end of the first capacitor, a gate, and a drain. The control switch has a first end coupled to the gate of the power transistor and a second end coupled to the drain or the source of the power transistor. When in the first phase the control switch is "on", the power transistor is "off", and when in the second phase, the control switch is "off", the voltage on the drain of the power transistor is maintained at a predetermined value by the linear voltage-regulating switch. The second capacitor has a first end coupled to the drain of the power transistor and a second end grounded. An output voltage is obtained from the first end of the second capacitor.

In the charge pumping circuit according to an embodiment of the present invention, the linear voltage-regulating switch further includes an amplifier. The amplifier has a first input end coupled to a feedback voltage, a second input end inputting a reference voltage, and an output end coupled to the gate of the power transistor. The amplifier compares the feedback voltage and the reference voltage to control the gate of the power transistor, so as to maintain the voltage on the drain of the power transistor at the predetermined value. The feedback voltage is equal to the voltage on the drain of the power transistor multiplied by a feedback ratio. When the power transistor is a P-type transistor, the first input end of the amplifier is a positive-phase input end, and the second input end is a negative-phase input end. When the power transistor is an N-type transistor, the first input end of the amplifier is a negative-phase input end, and the second input end is a positive-phase input end.

In the charge pumping circuit according to an embodiment of the present invention, the linear voltage-regulating switch further includes a plurality of resistors connected in series, having one end coupled to the drain of the power transistor and the other end grounded. The feedback voltage is obtained from any serial connection point of the resistors.

The charge pumping circuit according to an embodiment of the present invention is applicable to the multi-power system.

A charge pumping circuit including a linear voltage-regulating switch, a first switch, a first capacitor, a second switch, a third switch, and a second capacitor is provided. The linear voltage-regulating switch includes a power transistor and a control switch. The power transistor has a source coupled to a power voltage, a gate, and a drain. The control switch has a first end coupled to the gate of the power transistor and a second end coupled to the drain or the source of the power transistor. When in a first phase, the control switch is "off", and the voltage on the drain of the power transistor is maintained at a predetermined value by the linear voltage-regulating switch, and when in a second phase, the control switch is "on", the power transistor is "off". The first switch has a first end receiving an input voltage and a second end. The first switch is "off" in the first phase, and "on" in the second phase. The first capacitor has a first end coupled to the drain of the power transistor and a second end coupled to the second end of the first switch. The second switch has a first end coupled to the second end of the first capacitor and a second end grounded. The second switch is "on" in the first phase, and "off" in the second phase. The third switch has a first end coupled to the first end of the first capacitor and a second end. The third switch is "off" in the first phase, and "on" in the second phase. The second capacitor has a first end coupled to the second end of the third switch and a second end grounded. An output voltage is obtained from the first end of the second capacitor.

In the charge pumping circuit according to an embodiment of the present invention, the linear voltage-regulating switch further includes an amplifier. The amplifier has a first input end coupled to a feedback voltage, a second input end inputting a reference voltage, and an output end coupled to the gate of the power transistor. The amplifier compares the feedback voltage and the reference voltage to control the gate of the power transistor, so as to maintain the voltage on the drain of the power transistor at the predetermined value. The feedback voltage is equal to the voltage on the drain of the power transistor multiplied by a feedback ratio. When the power transistor is a P-type transistor, the first input end of the amplifier is a positive-phase input end, and the second input end is a negative-phase input end. When the power transistor is an N-type transistor, the first input end of the amplifier is a negative-phase input end, and the second input end is a positive-phase input end.

In the charge pumping circuit according to an embodiment of the present invention, the linear voltage-regulating switch further includes a plurality of resistors connected in series, having one end coupled to the drain of the power transistor and the other end grounded. The feedback voltage is obtained from any serial connection point of the resistors.

The charge pumping circuit according to an embodiment of the present invention is applicable to the multi-power system.

The present invention adopts the power circuit and the charge pumping circuit, thus saving one switch of large area and a capacitor of one large area, and adds one control switch to control the power transistor, thereby reducing the cost and improving the efficiency.

In order to the make aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 4A:
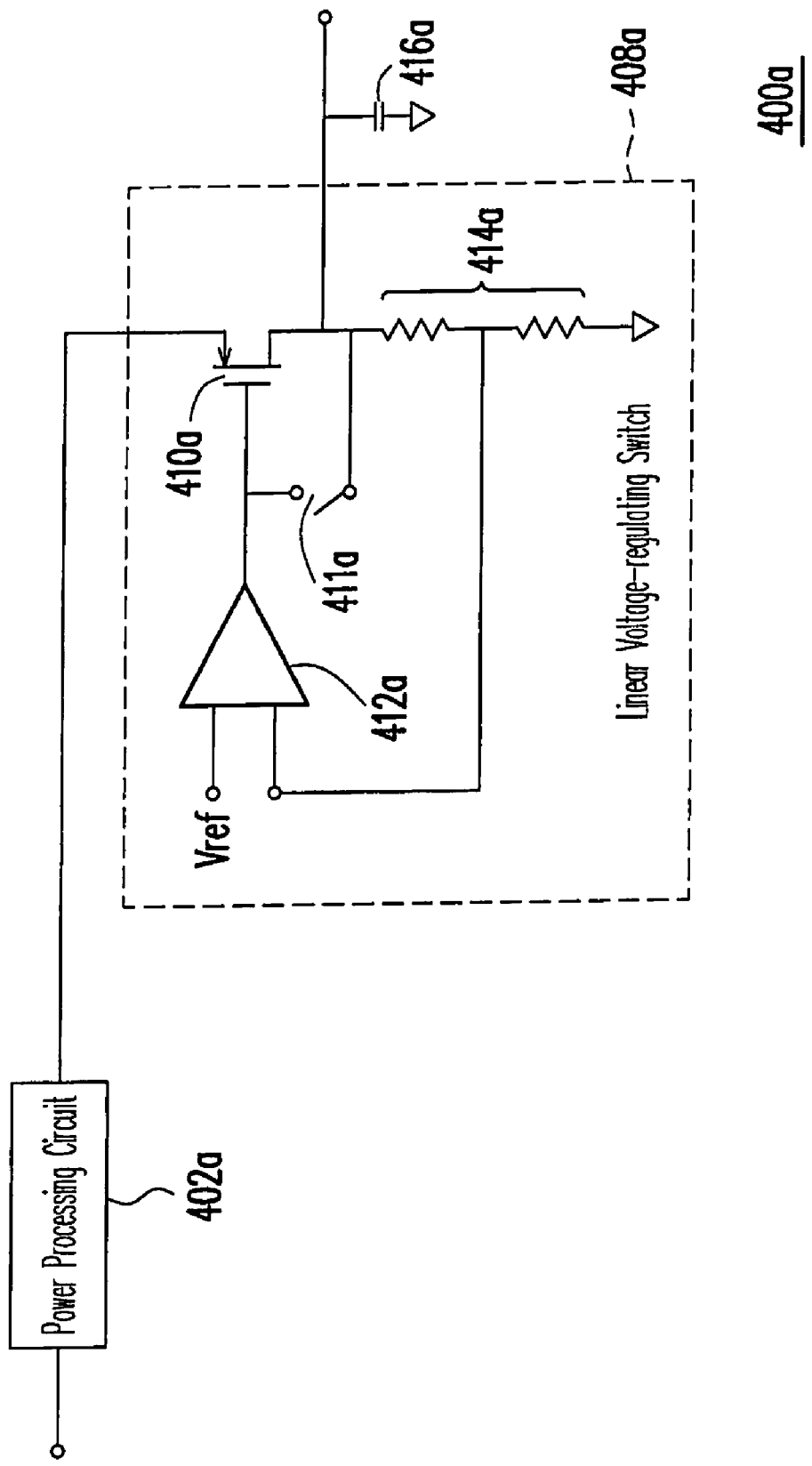
FIGS. 4a and 4b show power circuits according to an embodiment of the present invention.
Figure 4B:
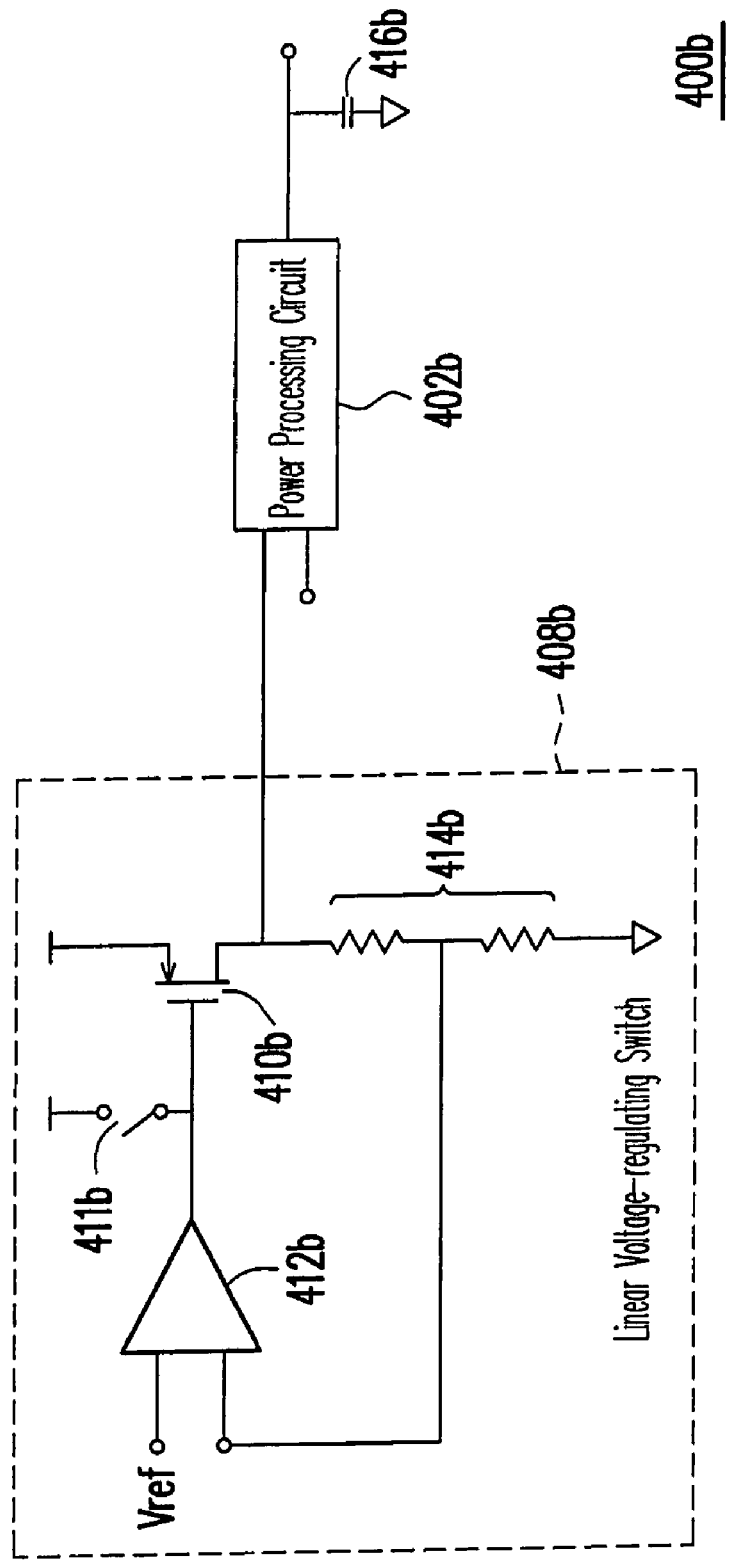

FIGS. 4a and 4b show power circuits according to an embodiment of the present invention.

The power circuit in FIG. 4a firstly performs the voltage transformation process, and then performs the voltage regulation process. As shown in FIG. 4a, the power circuit 400a includes a power processing circuit 402a, a linear voltage-regulating switch 408a, and a capacitor 416a. The power processing circuit 402a has a first end and a second end. The first end of the power processing circuit 402a is coupled to an input voltage, and the voltage characteristics (e.g. the voltage magnitude, the duty cycle, and so on) of the voltages on the first end and the second end of the power processing circuit 402a are different. The power processing circuit 402a can be, for example, a voltage doubler circuit, a negative-voltage generating circuit, or a pulse width modulating circuit etc. The linear voltage-regulating switch 408a can include a power transistor 410a, a control switch 411a, an amplifier 412a, and a plurality of resistors 414a connected in series. The power transistor 410a has a source, a gate, and a drain. The source of the power transistor 410a is coupled to the second end of the power processing circuit 402a. The control switch 411a has a first end and a second end, the first end of the control switch 411a is coupled to the gate of the power transistor 410a, and the second end of the control switch 411a is coupled to the drain of the power transistor 410a. When the control switch 411a is "on", the power transistor 410a is "off", and when the control switch 411a is "off", the voltage on the drain of the power transistor 410a is maintained at a predetermined value by the linear voltage-regulating switch 408a. One end of the plurality of resistors 414a connected in series is coupled to the drain of the power transistor 410a, and the other end of the plurality of resistors 414a connected in series is grounded. The amplifier 412a has a first input end, a second input end, and an output end. The first input end is coupled to any serial connection point of the resistor 414a to acquire a feedback voltage, the second input end inputs a reference voltage Vref, and the output end is coupled to the gate of the power transistor 410a. The amplifier 412a compares the feedback voltage and the reference voltage to control the gate of the power transistor 410a, so as to maintain the voltage on the drain of the power transistor 410a at the predetermined value. When the power transistor 410a is a P-type transistor, the first input end of the amplifier 412a is a positive-phase input end, and the second input end is a negative-phase input end. When the power transistor 410a is an N-type transistor, the first input end of the amplifier 412a is a negative-phase input end, and the second input end is a positive-phase input end. The capacitor 416a has a first end and a second end, the first end of the capacitor 416a is coupled to the drain of the power transistor 410a, and the second end of the capacitor 416a is grounded. The output voltage is obtained from the first end of the capacitor 416a.

In the embodiment of FIG. 4a, all the components in the linear voltage-regulating switch 408a are described in detail, but are not intended to limit the present invention. In practice, the linear voltage-regulating switch at least includes the power transistor and the control switch. The first end of the control switch is coupled to the gate of the power transistor, and the second end of the control switch is coupled to the drain or the source of the power transistor. When the control switch is "on", the power transistor is "off", and when the control switch is "off", the voltage on the drain of the power transistor is maintained at a predetermined value by the linear voltage-regulating switch. Further, in the embodiment of FIG. 4a, the comparing architecture including the amplifier 412a is used, but does not intend to limit the present invention, and usually the reference voltage is lower than the predetermined voltage on the drain of the power transistor, so the feedback voltage is equal to the voltage on the drain of the power transistor 410a multiplied by a certain feedback ratio, so that the amplifier 412a compares the feedback voltage and the reference voltage to control the gate of the power transistor 410a, and further the voltage on the drain of the power transistor 410a is maintained at the predetermined value.

In an embodiment, the control switch 411a can be controlled by a control signal (not shown). For example, only one inverter is required to generate the control signal, or the control signal already exists in certain power circuits.

Figure 1A:
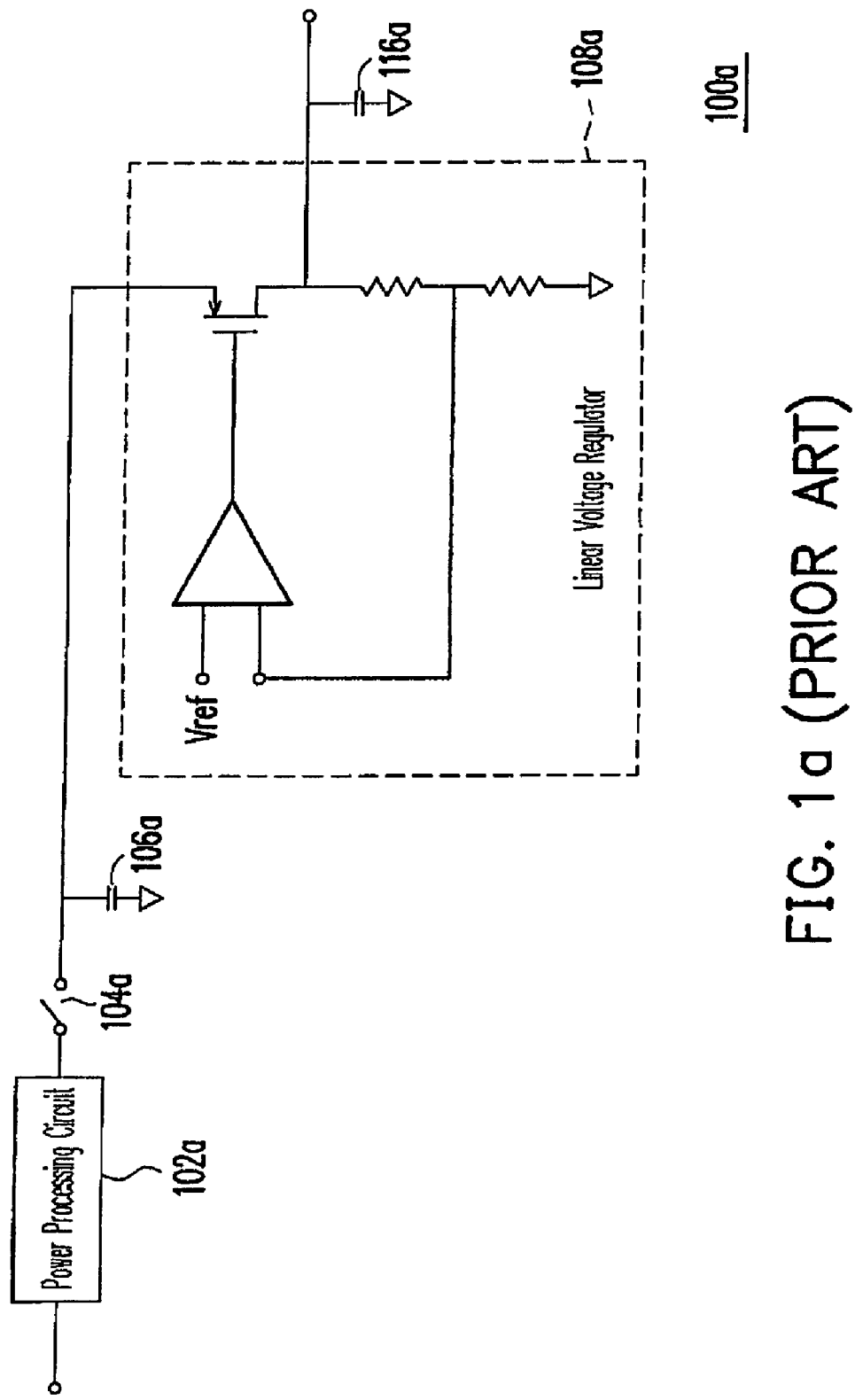
FIGS. 1a and 1b show power circuits according to the conventional art.

To sum up, compared with the power circuit 100a according to the conventional art of FIG. 1a, a control switch 411a is added, but no large current passes through the control switch 411a. Thus, the size is approximately only hundreds or thousands of times less than the size of the switch 104a. For example, compared with the power circuit 100a, the power circuit 400a saves one switch 104a of large area and one capacitor 106a of large area.

The power circuit in FIG. 4b firstly performs the voltage regulation process, and then performs the voltage transformation process. As shown in FIG. 4b, the power circuit 400b includes a linear voltage-regulating switch 408b, a power processing circuit 402b, and a capacitor 416b. The linear voltage-regulating switch 408b includes a power transistor 410b, a control switch 411b, an amplifier 412b, and a plurality of resistors 414b connected in series. The power transistor 410b has a source, a gate, and a drain, and the source of the power transistor 410b is coupled to a power voltage. The control switch 411b has a first end and a second end, the first end of the control switch 411b is coupled to the gate of the power transistor 410b, and the second end of the control switch 411b is coupled to the source of the power transistor 410b. When the control switch 411b is "on", the power transistor 410b is "off", and when the control switch 411b is "off", the voltage on the drain of the power transistor 410b is maintained at a predetermined value by the linear voltage-regulating switch 408b. One end of the plurality of resistors 414b connected in series is coupled to the drain of the power transistor 410b, and the other end of the plurality of resistors 414b connected in series is grounded. The amplifier 412b has a first input end, a second input end, and an output end. The first input end is coupled to any serial connection point of the resistor 414b to obtain a feedback voltage, the second input end inputs a reference voltage Vref, and the output end is coupled to the gate of the power transistor 410b. The amplifier 412b compares the feedback voltage and the reference voltage to control the gate of the power transistor 410b, so as to maintain the voltage on the drain of the power transistor 410b at the predetermined value. When the power transistor 410b is a P-type transistor, the first input end of the amplifier 412b is a positive-phase input end, and the second input end is a negative-phase input end. When the power transistor 410b is an N-type transistor, the first input end of the amplifier 412b is a negative-phase input end, and the second input end is a positive-phase input end. The power processing circuit 402b has a first end and a second end, the first end of the power processing circuit 402b is coupled to the drain of the power transistor 410b, and the voltage characteristics (e.g. the voltage magnitude or the duty cycle etc.) of the voltages on the first end and the second end of the power processing circuit 402b are different. The power processing circuit 402b may be, for example, a voltage doubler circuit, a negative-voltage generating circuit, or a pulse width modulating circuit etc. The power processing circuit 402b may further have a third ends coupled to an input voltage. The power processing circuit 402b changes a voltage on the first end of the power processing circuit 402b according to the input voltage, so as to obtain a voltage on the second end of the power processing circuit 402b. Definitely, the third end and the first end can be connected together depending on the application of the power circuit. The capacitor 416b has a first end and a second end, the first end of the capacitor 416b is coupled to the second end of the power processing circuit 402b, and the second end of the capacitor 416b is grounded.

In the embodiment of FIG. 4b, all the components in the linear voltage-regulating switch 408b are described in detail, but are not intended to limit the present invention. In practice, the linear voltage-regulating switch at least includes the power transistor and the control switch. The first end of the control switch is coupled to the gate of the power transistor, and the second end of the control switch is coupled to the drain or the source of the power transistor. When the control switch is "on", the power transistor is "off", and when the control switch is "off", the voltage on the drain of the power transistor is maintained at a predetermined value by the linear voltage-regulating switch. Further, in the embodiment of FIG. 4b, the comparing architecture including the amplifier 412b is used, but does not intend to limit the present invention. Usually the reference voltage is lower than the predetermined voltage on the drain of the power transistor, so the feedback voltage is equal to the voltage on the drain of the power transistor 410b multiplied by a certain feedback ratio.

In an embodiment, the control switch 411b may be controlled by a control signal (not shown). For example, only one inverter is required to generate the control signal, or the control signal already exists in certain power circuits.

Figure 1B:
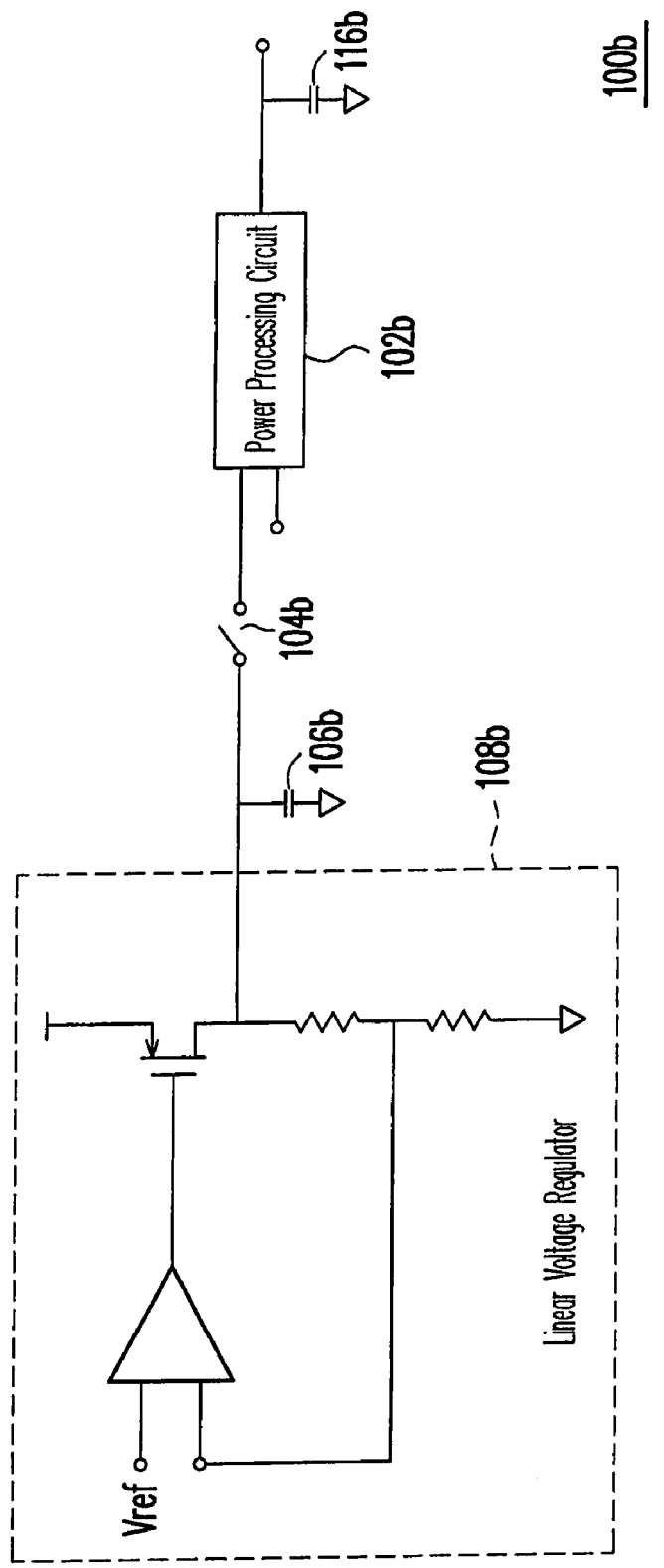

To sum up, as compared with the power circuit 100b according to the conventional art of FIG. 1b, one control switch 411b is added, and one capacitor 106b of large area and one switch 104b of large area are saved.

Figure 5A:
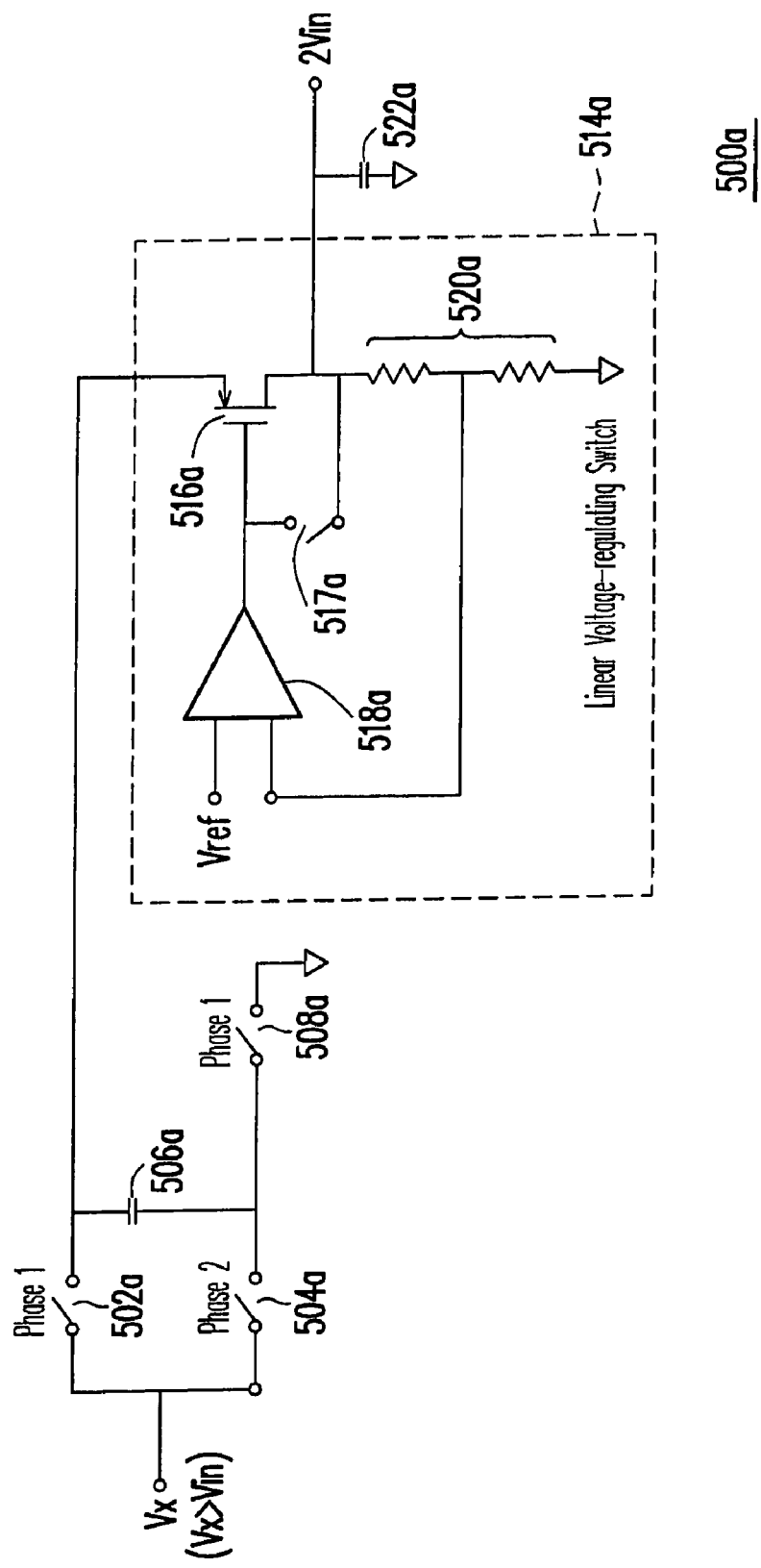
FIGS. 5a and 5b show double charge pumping circuits according to an embodiment of the present invention.
Figure 5B:
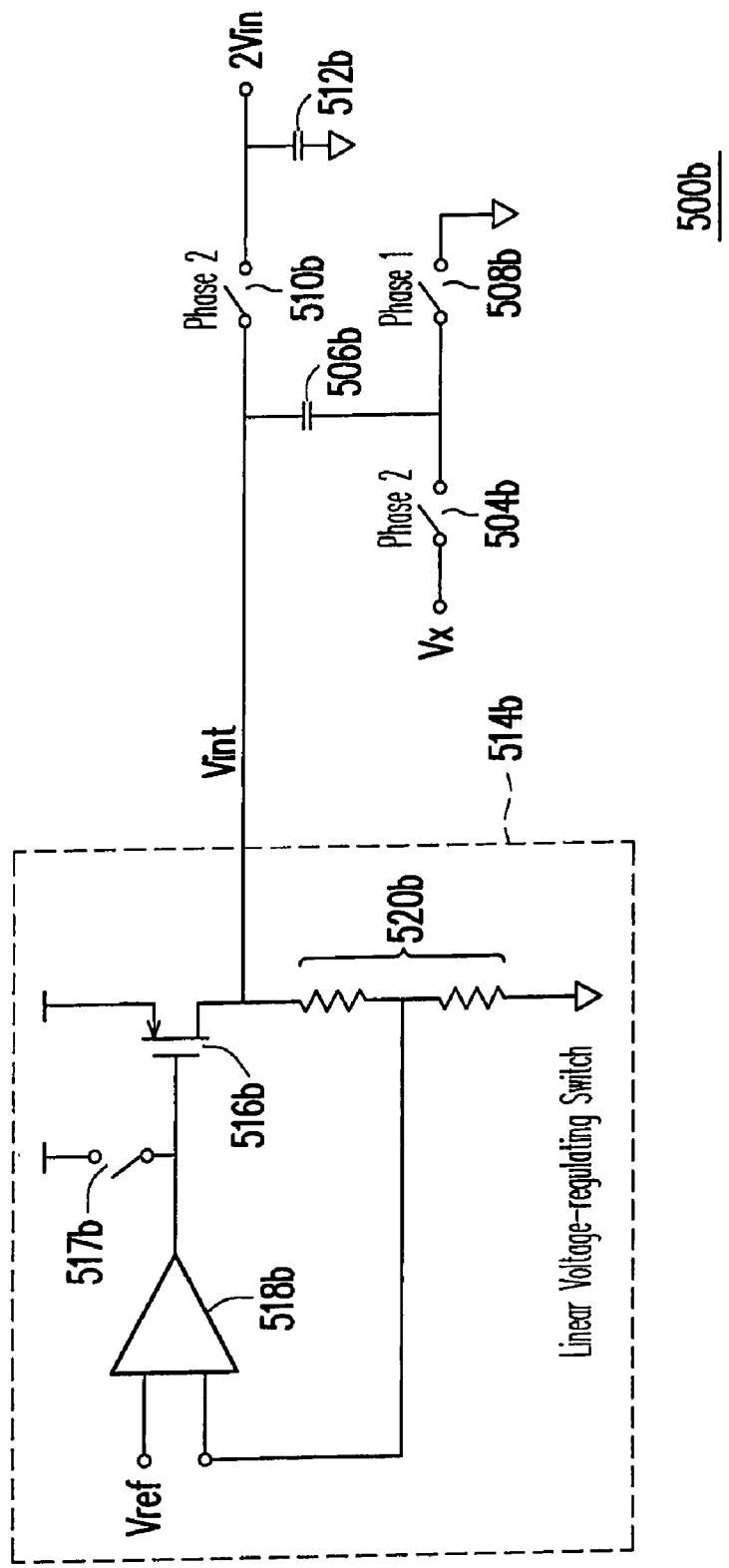

FIGS. 5a and 5b show double charge pumping circuits according to an embodiment of the present invention.

The double charge pumping circuit in FIG. 5a firstly performs the double voltage transformation process, and then performs the voltage regulation process. As shown in FIG. 5a, the double charge pumping circuit 500a includes a first switch 502a, a second switch 504a, a first capacitor 506a, a third switch 508a, a linear voltage-regulating switch 514a, and a second capacitor 522a. The first switch 502a has a first end and a second end, and the first end of the first switch 502a is coupled to an input voltage Vx (Vx>Vin). The second switch 504a has a first end and a second end, and the first end of the second switch 504a is coupled to the input voltage. The first capacitor 506a has a first end and a second end, the first end of the first capacitor 506a is coupled to the second end of the first switch 502a, and the second end of the first capacitor 506a is coupled to the second end of the second switch 504a. The third switch 508a has a first end and a second end, the first end of the third switch 508a is coupled to the second end of the first capacitor 506a, and the second end of the third switch 508a is grounded. The linear voltage-regulating switch 514a includes a power transistor 516a, a control switch 517a, an amplifier 518a, and a plurality of resistors 520a connected in series. The power transistor 516a has a source, a gate, and a drain, and the source of the power transistor 516a is coupled to the first end of the first capacitor 506a. The control switch 517a has a first end and a second end, the first end of the control switch 517a is coupled to the gate of the power transistor 516a, and the second end of the control switch 517a is coupled to the drain of the power transistor 516a. One end of the plurality of resistors 520a connected in series is coupled to the drain of the power transistor 516a, and the other end of the plurality of resistors 520a connected in series is grounded. The amplifier 518a has a first input end, a second input end, and an output end. The first input end is coupled to any serial connection point of the resistor 520a to obtain a feedback voltage, the second input end inputs a reference voltage Vref, and the output end is coupled to the gate of the power transistor 516a. When the power transistor 516a is a P-type transistor, the first input end of the amplifier 518a is a positive-phase input end, and the second input end is a negative-phase input end. When the power transistor 516a is an N-type transistor, the first input end of the amplifier 518a is a negative-phase input end, and the second input end is a positive-phase input end. The second capacitor 522a has a first end and a second end, the first end of the second capacitor 522a is coupled to the drain of the power transistor 516a, and the second end of the second capacitor 522a is grounded. The output voltage is obtained from the first end of the second capacitor 522a.

When the circuit enters the first phase (the phase 1 indicated in the figure), the first switch 502a and the third switch 508a are "on", so as to charge the first capacitor 506a. Here, the control switch 517a is "on", the power transistor 516a is "off". When the circuit enters the second phase (the phase 2 indicated in the figure), the second switch 504a is "on", the first switch 502a, the third switch 508a, and the control switch 517a are "off", the input voltage and the first capacitor 506a are connected in series, and the voltage becomes 2Vx. In the linear voltage-regulating switch 514a, the amplifier 518a compares the feedback voltage and the reference voltage to control the gate of the power transistor 516a, such that the voltage on the drain of the power transistor 516a is maintained at the predetermined value 2Vin, thereby maintaining the output voltage at the predetermined value 2Vin.

In the embodiment of FIG. 5a, all the components in the linear voltage-regulating switch 514a are described in detail, but are not intended to limit the present invention. In practice, the linear voltage-regulating switch can at least include the power transistor and the control switch. The first end of the control switch is coupled to the gate of the power transistor, and the second end of the control switch is coupled to the drain or the source of the power transistor. When the control switch is "on", the power transistor is "off", and when the control switch is "off", the voltage on the drain of the power transistor is maintained at a predetermined value by the linear voltage-regulating switch. Further, in the embodiment of FIG. 5a, the comparing architecture including the amplifier 518a is used, but does not intend to limit the present invention. Usually the reference voltage is lower than the predetermined voltage on the drain of the power transistor, so the feedback voltage is equal to the voltage on the drain of the power transistor 516a multiplied by a certain feedback ratio.

In an embodiment, the control switch 517a may be controlled by a control signal (not shown, for example the same as the phase 1). For example, only one inverter is required to invert the phase 2 to generate the control signal, or the control signal already exists in certain power circuits.

Figure 2A:
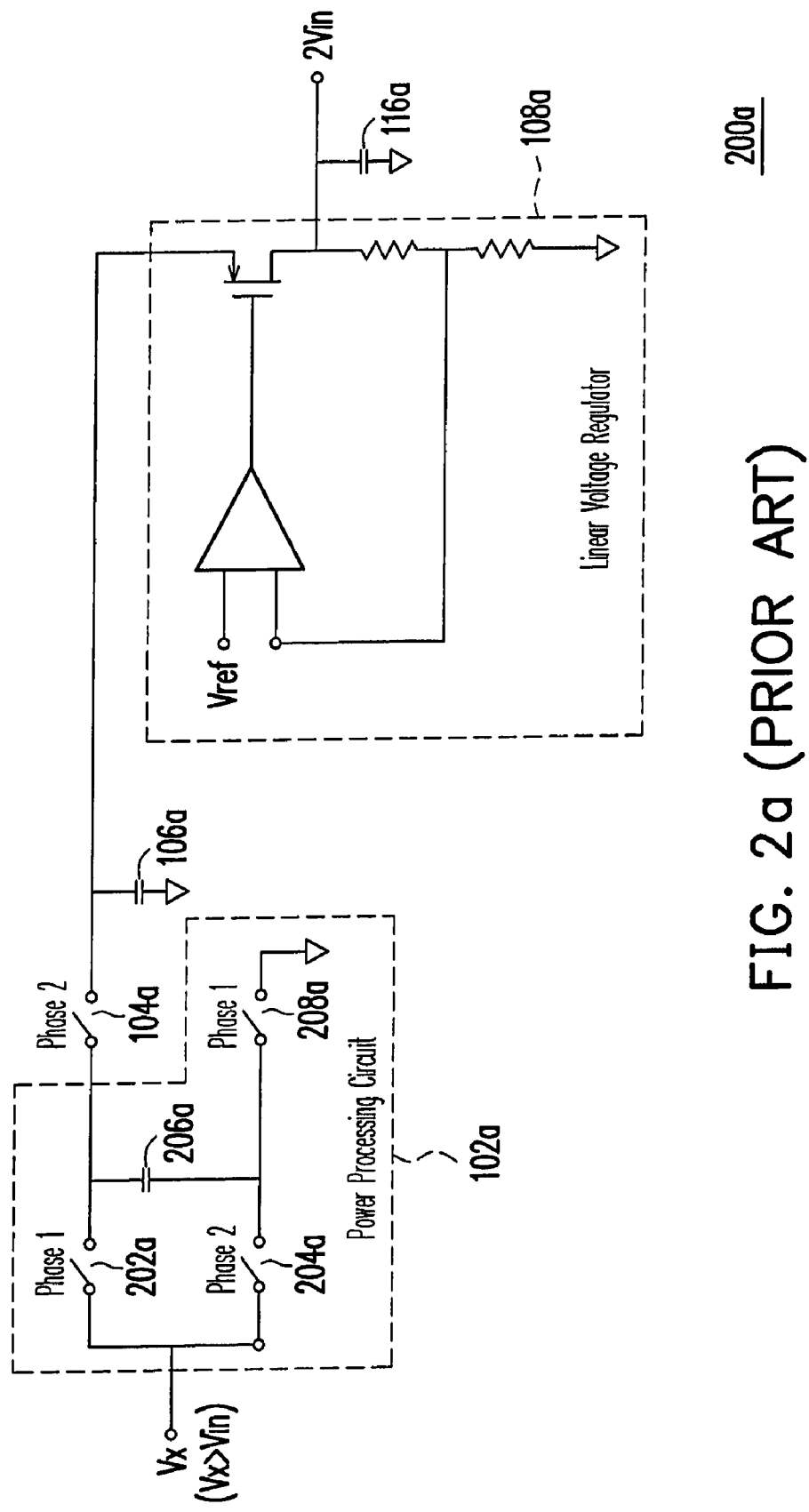
FIGS. 2a and 2b show double charge pumping circuits corresponding to FIGS. 1a and 1b according to the conventional art respectively.

To sum up, as compared with the double charge pumping circuit 200a according to the conventional art of FIG. 2a, a control switch 517a is added, but no large current passes through the control switch 517a. Therefore, the size is approximately only hundreds or thousands of times less than the size of the fourth switch 210a. For the example, as compared with the double charge pumping circuit 200a, the double charge pumping circuit 500a saves one switch 210a of large area and one capacitor 212a of large area.

The double charge pumping circuit in FIG. 5b firstly performs the voltage regulation, and then performs the double voltage transformation process. As shown in FIG. 5b, the double charge pumping circuit 500b includes a linear voltage-regulating switch 514b, a first switch 504b, a first capacitor 506b, a second switch 508b, a third switch 510b, and a second capacitor 512b. The linear voltage-regulating switch 514b includes a power transistor 516b, a control switch 517b, an amplifier 518b, and a plurality of resistors 520b connected in series. The power transistor 516b has a source, a gate, and a drain, and the source of the power transistor 516b is coupled to a power voltage. The control switch 517b has a first end and a second end, the first end of the control switch 517b is coupled to the gate of the power transistor 516b, and the second end of the control switch 517b is coupled to the source of the power transistor 516b. One end of the plurality of resistors 520b connected in series is coupled to the drain of the power transistor 516b, and the other end of the plurality of resistors 520b connected in series is grounded. The amplifier 518b has a first input end, a second input end, and an output end. The first input end is coupled to any serial connection point of the resistor 520b to obtain a feedback voltage, the second input end inputs a reference voltage Vref, and the output end is coupled to the gate of the power transistor 516b. When the power transistor 516b is a P-type transistor, the first input end of the amplifier 518b is a positive-phase input end, and the second input end is a negative-phase input end. When the power transistor 516b is an N-type transistor, the first input end of the amplifier 518b is a negative-phase input end, and the second input end is a positive-phase input end. The first switch 504b has a first end and a second end, and the first end of the first switch 504b is coupled to an input voltage Vx (Vx>Vin). The first capacitor 506b has a first end and a second end, the first end of the first capacitor 506b is coupled to the drain of the power transistor 516a, and the second end of the first capacitor 506b is coupled to the second end of the first switch 504b. The second switch 508b has a first end and a second end, the first end of the second switch 508b is coupled to the second end of the first capacitor 506b, and the second end of the second switch 508b is grounded. The third switch 510b has a first end and a second end, the first end of the third switch 510b is coupled to the first end of the first capacitor 506b. The second capacitor 512b has a first end and a second end, the first end of the second capacitor 512b is coupled to the second end of the third switch 510b, and the second end of the second capacitor 512b is grounded. The output voltage is obtained from the first end of the second capacitor 512b.

When the circuit enters the first phase (the phase 1 indicated in the figure), in the linear voltage-regulating switch 514b, the control switch 517b is "off", the amplifier 518 compares the feedback voltage and the reference voltage to control the gate of the power transistor 516b, such that the voltage on the drain of the power transistor 516b is maintained at the predetermined value Vint. The second switch 508b is "on", the first capacitor 506b is charged until the voltage becomes Vint. The first switch 504b and the third switch 510b are "off". When the circuit enters the second phase (the phase 2 indicated in the figure), the first switch 504b and the third switch 510b are "on", the second switch 508b is "off", the voltage on the first capacitor 506 and Vx are connected in series, such that the output voltage is maintained at the predetermined value 2Vin.

In the embodiment of FIG. 5b, all the components in the linear voltage-regulating switch 514b are described in detail, but are not intended to limit the present invention. In practice, the linear voltage-regulating switch at least includes the power transistor and the control switch. The first end of the control switch is coupled to the gate of the power transistor, and the second end of the control switch is coupled to the drain or the source of the power transistor. When the control switch is "on", the power transistor is "off", and when the control switch is "off", the voltage on the drain of the power transistor is maintained at a predetermined value by the linear voltage-regulating switch. Further, in the embodiment of FIG. 5b, the comparing architecture including the amplifier 518b is used, but does not intend to limit the present invention, and usually the reference voltage is lower than the predetermined voltage on the drain of the power transistor, so the feedback voltage is equal to the voltage on the drain of the power transistor 516b multiplied by a certain feedback ratio.

In an embodiment, the control switch 517b may be controlled by a control signal (not shown, for example the same as the phase 2). For example, only one inverter is required to invert the phase 1 to generate the control signal, or the control signal already exists in certain power circuits.

Figure 2B:
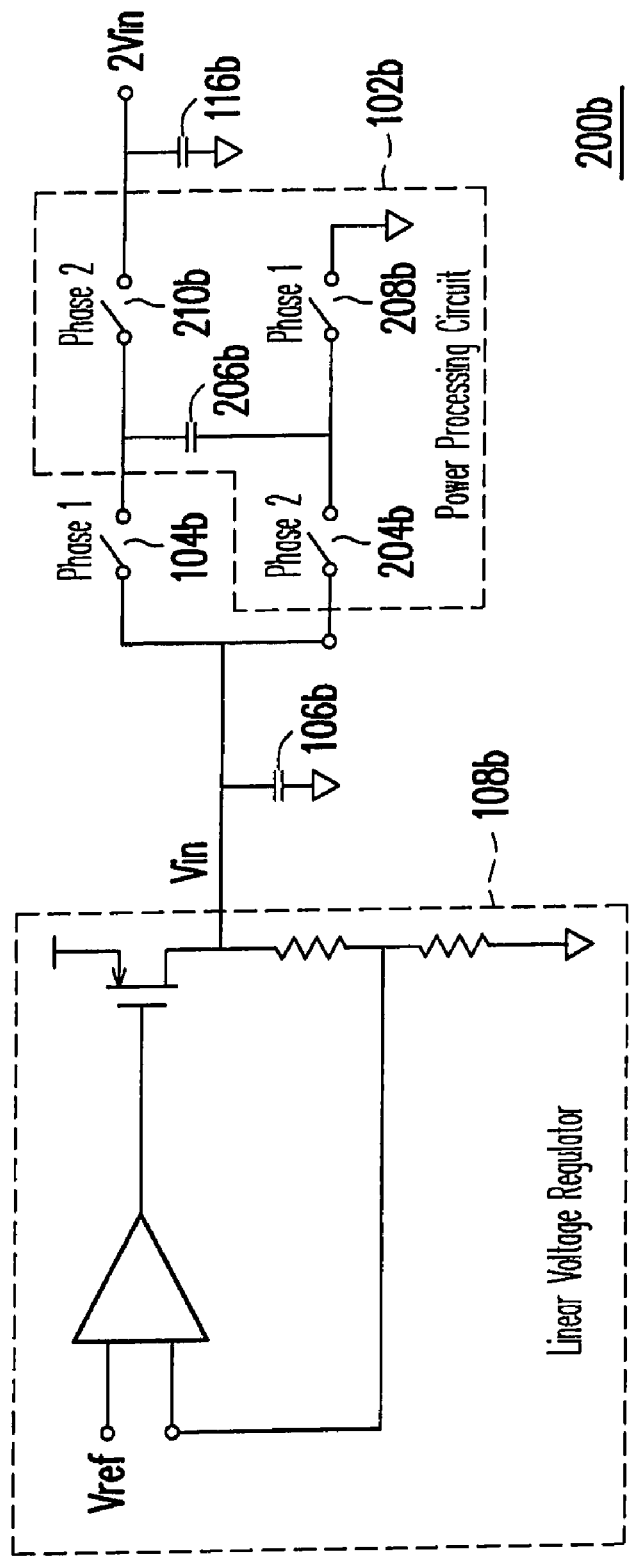

To sum up, as compared with the double charge pumping circuit 200b according to the conventional art of FIG. 2b, one control switch 517a is added, and one capacitor 222b of large area and one switch 202b of large area are saved.

Figure 6:
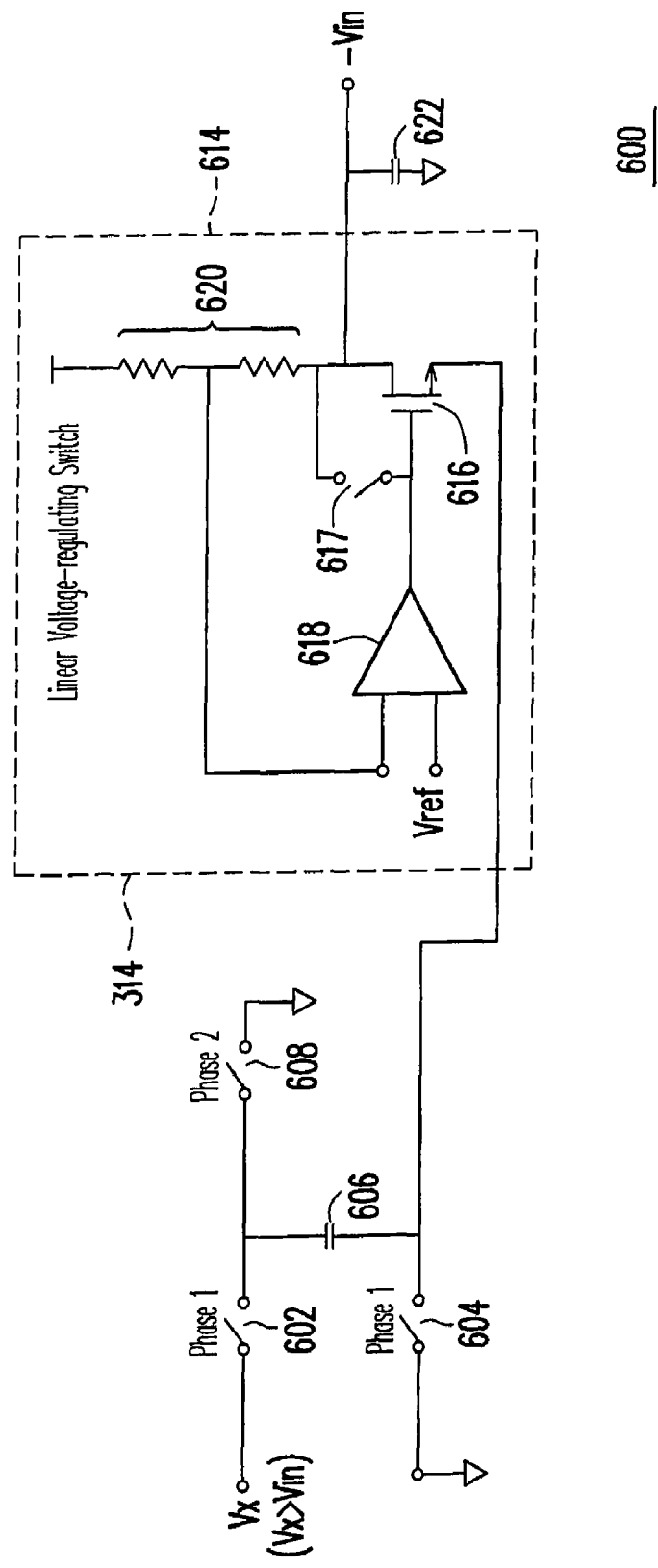
FIG. 6 shows a negative-voltage charge pumping circuit according to an embodiment of the present invention.

FIG. 6 shows a negative-voltage charge pumping circuit according to an embodiment of the present invention. In FIG. 6, firstly the voltage transformation is performed, and then the voltage regulation process is performed. As shown in FIG. 6, the negative-voltage charge pumping circuit 600 includes a first switch 602, a second switch 604, a first capacitor 606, a third switch 608, a linear voltage-regulating switch 614, and a second capacitor 622. The first switch 602 has a first end and a second end, and the first end of the first switch 602 is coupled to an input voltage. The second switch 604 has a first end and a second end, and the first end of the second switch 604 is grounded. The first capacitor 606 has a first end and a second end, the first end of the first capacitor 606 is coupled to the second end of the first switch 602, and the second end of the first capacitor 606 is coupled to the second end of the second switch 604. The third switch 608 has a first end and a second end, the first end of the third switch 608 is coupled to the first end of the first capacitor 606, and the second end of the third switch 608 is grounded. The linear voltage-regulating switch 614 includes a power transistor 616, a control switch 617, an amplifier 618, and a plurality of resistors 620 connected in series. The power transistor 616 has a source, a gate, and a drain, and the drain of the power transistor 616 is coupled to the second end of the first capacitor 606. The control switch 617 has a first end and a second end, the first end of the control switch 617 is coupled to the gate of the power transistor 616, and the second end of the control switch 617 is coupled to the source of the power transistor 616. One end of the plurality of resistors 620 connected in series is coupled to the power voltage, and the other end of the plurality of resistors 620 connected in series is connected to the source of the power transistor 616. The amplifier 618 has a first input end, a second input end, and an output end. The first input end is coupled to any serial connection point of the resistors 620 to obtain the feedback voltage, the second input end inputs the reference voltage Vref, and the output end is coupled to the gate of the power transistor 616. When the power transistor 616 is a P-type transistor, the first input end of the amplifier 618 is a negative-phase input end, and the second input end is a positive-phase input end. When the power transistor 616 is an N-type transistor, the first input end of the amplifier 618 is a positive-phase input end, and the second input end is a negative-phase input end. The second capacitor 622 has a first end and a second end, the first end of the second capacitor 622 is coupled to the source of the power transistor 616, and the second end of the second capacitor 622 is grounded. The output voltage is obtained from the first end of the second capacitor 622.

When the circuit enters the first phase (the phase 1 indicated in the figure), the first switch 602 and the second switch 604 are "on", so as to charge the first capacitor 606. Here, the control switch 617 is "on", the power transistor 616 is "off". When the circuit enters the second phase (the phase 2 indicated in the figure), the third switch 608 is "on", the first switch 602, the second switch 604, and the control switch 617 are "off", the voltage becomes −Vx. In the linear voltage-regulating switch 614, the amplifier 618 compares the feedback voltage and the reference voltage to control the gate of the power transistor 616, such that the voltage on the source of the power transistor 616 is maintained at the predetermined value −Vin, thereby maintaining the output voltage at the predetermined value −Vin.

In an embodiment, the control switch 617 may be controlled by a control signal (not shown, for example the same as the phase 1). For example, only one inverter is required to invert the phase 2 to generate the control signal, or the control signal already exists in certain power circuits.

Figure 3:
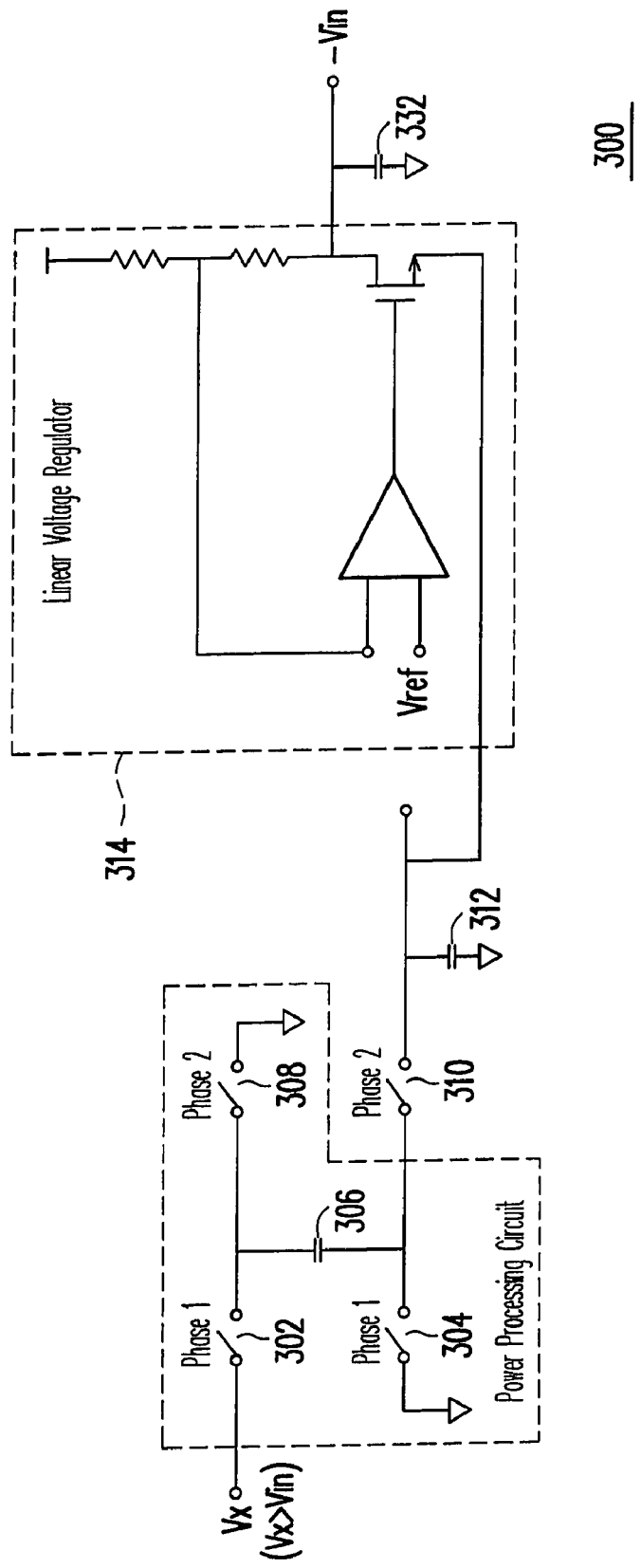
FIG. 3 shows a negative-voltage charge pumping circuit according to the conventional art.

To sum up, as compared with the negative-voltage charge pumping circuit 300 according to the conventional art of FIG. 3, one control switch 617 is added, but no large current passes through the control switch 617. Therefore, the size is approximately only hundreds or thousands of times less than the size of the fourth switch 310. For the example, as compared with the negative-voltage charge pumping circuit 300, the negative-voltage charge pumping circuit 600 saves one switch 310 of large area and one capacitor 312 of large area.

Figure 7:
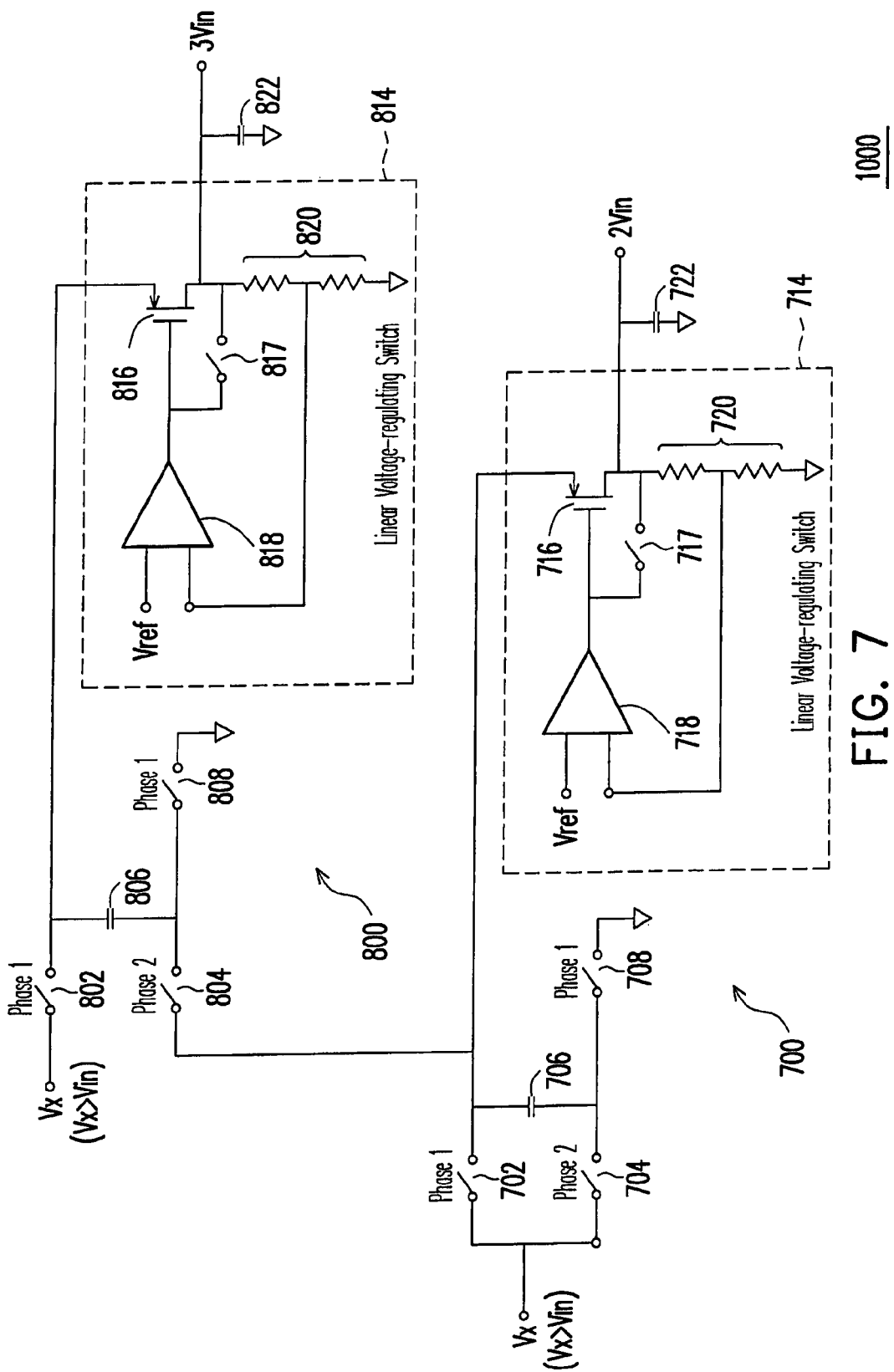
FIG. 7 shows the application of the double charge pumping circuit in a multi-power system according to an embodiment of the present invention.

FIG. 7 shows the application of the double charge pumping circuit in a multi-power system according to an embodiment of the present invention.

As shown in FIG. 7, the multi-power double charge pumping circuit 1000 includes a first double charge pumping circuit 700 and a second charge pumping circuit 800. The first charge pumping circuit 700 includes a first switch 702, a second switch 704, a first capacitor 706, a third switch 708, a linear voltage-regulating switch 714, and a second capacitor 722. The linear voltage-regulating switch 714 includes a power transistor 716, a control switch 717, an amplifier 718, and a plurality of resistors 720 connected in series. The coupling relationship of the first charge pumping circuit 700 is similar to that of FIG. 5a, so the details will not be described herein again. The second charge pumping circuit 800 includes a first switch 802, a second switch 804, a first capacitor 806, a third switch 808, a linear voltage-regulating switch 814, and a second capacitor 822. The linear voltage-regulating switch 814 includes a power transistor 816, a control switch 817, an amplifier 818, and a plurality of resistors 820 connected in series. The first switch 802 has a first end and a second end, and the first end of the first switch 802 is coupled to another input voltage Vx (Vx>Vin). The second switch 804 has a first end and a second end, and the first end of the second switch 804 is coupled to the first end of the first capacitor 706 of the first charge pumping circuit 700. The coupling relationship of other devices is similar to that of FIG. 5a, so the details will not be described herein again.

When the circuit enters the first phase (the phase 1 indicated in the figure), the first switch 702 and the third switch 708 of the first charge pumping circuit 700 are "on", so as to charge the first capacitor 706. Here, the control switch 717 is "on", and the power transistor 716 is "off". The first switch 802 and the third switch 808 of the second charge pumping circuit 800 are "on", so as to charge the first capacitor 806. Here, the control switch 817 is "on", and the power transistor 816 is "off".

When the circuit enters the second phase (the phase 2 indicated in the figure), the second switch 704 of the first charge pumping circuit 700 is "on", the first switch 702, the third switch 708, and the control switch 717 are "off", the input voltage and the first capacitor 706 are connected in series, and the voltage becomes 2Vx. In the linear voltage-regulating switch 714, the amplifier 718 compares the feedback voltage and the reference voltage to control the gate of the power transistor 718, such that the voltage on the drain of the power transistor 718 is maintained at the predetermined value 2Vin, thereby maintaining the output voltage at the predetermined value 2Vin. The second switch 804 of the second charge pumping circuit 800 is "on", the first switch 802, the third switch 808, and the control switch 817 are "off", the input voltage and the first capacitor 706 of the first charge pumping circuit 700 are connected in series, and then connected in series with the first capacitor 806 of the second charge pumping circuit 800, and the total voltage becomes 3Vx. In the linear voltage-regulating switch 814, the amplifier 818 compares the feedback voltage and the reference voltage to control the gate of the power transistor 818, such that the voltage on the drain of the power transistor 818 is maintained at the predetermined value 3Vin, thereby maintaining the output voltage at the predetermined value 3Vin.

In an embodiment, the control switches 717 and 817 may be controlled by a control signal (not shown, for example the same as the phase 1). For example, only one inverter is required to invert the phase 2 to generate the control signal, or the control signal already exists in certain power circuits.

To sum up, in the power circuit and the charge pumping circuit of the present invention, one control switch is added to control the power transistor, and one switch of large area and one capacitor of large area are saved, thereby reducing the cost and improving the efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power circuit, comprising:
   a power processing circuit, having a first end coupled to an input voltage and a second end, wherein voltages on the first end and the second end of the power processing circuit have different voltage characteristics;
   a linear voltage-regulating switch, comprising:
   a power transistor, having a source coupled to the second end of the power processing circuit, a gate, and a drain; and
   a control switch, having a first end coupled to the gate of the power transistor and a second end coupled to the drain or the source of the power transistor, wherein when the control switch is "on", the power transistor being off, and when the control switch is "off", the voltage on the drain of the power transistor is maintained at a predetermined value by the linear voltage-regulating switch; and a capacitor, having a first end coupled to the drain of the power transistor and a second end grounded, wherein an output voltage is obtained from the first end of the capacitor.

2. The power circuit as claimed in claim 1, wherein the linear voltage-regulating switch further comprises:

an amplifier, having a first input end coupled to a feedback voltage, a second input end inputting a reference voltage, and an output end coupled to the gate of the power transistor, the amplifier comparing the feedback voltage and the reference voltage to control the gate of the power transistor, so as to maintain the voltage on the drain of the power transistor at the predetermined value, wherein the feedback voltage is equal to the voltage on the drain of the power transistor multiplied by a feedback ratio.

3. The power circuit as claimed in claim 2, wherein the linear voltage-regulating switch further comprises:

a plurality of resistors connected in series, having one end coupled to the drain of the power transistor and the other end grounded, wherein the feedback voltage is obtained from any serial connection point of the resistors.

4. The power circuit as claimed in claim 2, wherein when the power transistor is a P-type transistor, the first input end of the amplifier is a positive-phase input end, and the second input end is a negative-phase input end.

5. The power circuit as claimed in claim 1, wherein the power circuit is applicable to a multi-power system.

6. A power circuit, comprising:

a linear voltage-regulating switch, comprising:
 a power transistor, having a source coupled to a power voltage, a gate, and a drain; and
 a control switch, having a first end coupled to the gate of the power transistor and a second end coupled to the drain or the source of the power transistor, wherein when the control switch is "on", the power transistor is "off", and when the control switch is "off", the voltage on the drain of the power transistor is maintained at a predetermined value by the linear voltage-regulating switch;

a power processing circuit, having a first end coupled to the drain of the power transistor and a second end, wherein the voltages on the first end and the second end of the power processing circuit have different voltage characteristics; and a capacitor, having a first end coupled to the second end of the power processing circuit and a second end grounded, wherein an output voltage is obtained from the first end of the capacitor.

7. The power circuit as claimed in claim 6, wherein the power processing circuit further has a third end coupled to an input voltage, the power processing circuit changing a voltage on the first end of the power processing circuit according to the input voltage, so as to obtain a voltage on the second end of the power processing circuit.

8. The power circuit as claimed in claim 6, wherein the linear voltage-regulating switch further comprises:

an amplifier, having a first input end coupled to a feedback voltage, a second input end inputting a reference voltage, and an output end coupled to the gate of the power transistor, the amplifier comparing the feedback voltage and the reference voltage to control the gate of the power transistor, so as to maintain the voltage on the drain of the power transistor at the predetermined value, wherein the feedback voltage is equal to the voltage on the drain of the power transistor multiplied by a feedback ratio.

9. The power circuit as claimed in claim 8, wherein the linear voltage-regulating switch further comprises:

a plurality of resistors connected in series, having one end coupled to the drain of the power transistor and the other end grounded, wherein the feedback voltage is obtained from any serial connection point of the resistors.

10. The power circuit as claimed in claim 8, wherein when the power transistor is a P-type transistor, the first input end of the amplifier is a positive-phase input end, and the second input end is a negative-phase input end.

11. The power circuit as claimed in claim 6, wherein the power circuit is applicable to a multi-power system.

12. A charge pumping circuit, comprising:

a first switch, having a first end coupled to an input voltage and a second end, wherein the first switch is "on" in a first phase, and "off" in a second phase;

a second switch, having a first end coupled to the input voltage and a second end, wherein the second switch is "off" in the first phase, and "on" in the second phase;

a first capacitor, having a first end coupled to the second end of the first switch and a second end coupled to the second end of the second switch;

a third switch, having a first end coupled to the second end of the first capacitor and a second end grounded, wherein the third switch is "on" in the first phase, and "off" in the second phase;

a linear voltage-regulating switch, comprising:
 a power transistor, having a source coupled to the first end of the first capacitor, a gate, and a drain; and
 a control switch, having a first end coupled to the gate of the power transistor and a second end coupled to the drain or the source of the power transistor, wherein when in the first phase, the control switch is "on", the power transistor is "off", and when in the second phase, the control switch is "off", the voltage on the drain of the power transistor is maintained at a predetermined value by the linear voltage-regulating switch; and a second capacitor, having a first end coupled to the drain of the power transistor and a second end grounded, wherein an output voltage is obtained from the first end of the second capacitor.

13. The charge pumping circuit as claimed in claim 12, wherein the linear voltage-regulating switch further comprises:

an amplifier, having a first input end coupled to a feedback voltage, a second input end inputting a reference voltage, and an output end coupled to the gate of the power transistor, the amplifier comparing the feedback voltage and the reference voltage to control the gate of the power transistor, so as to maintain the voltage on the drain of the power transistor at the predetermined value, wherein the feedback voltage is equal to the voltage on the drain of the power transistor multiplied by a feedback ratio.

14. The charge pumping circuit as claimed in claim 13, wherein the linear voltage-regulating switch further comprises:

a plurality of resistors connected in series, having one end coupled to the drain of the power transistor and the other end grounded, wherein the feedback voltage is obtained from any serial connection point of the resistors.

15. The charge pumping circuit as claimed in claim 13, wherein when the power transistor is a P-type transistor, the first input end of the amplifier is a positive-phase input end, and the second input end is a negative-phase input end.

16. The charge pumping circuit as claimed in claim 12, wherein the power circuit is applicable to a multi-power system.

17. A charge pumping circuit, comprising:
a linear voltage-regulating switch, comprising:
- a power transistor, having a source coupled to a power voltage, a gate, and a drain; and
- a control switch, having a first end coupled to the gate of the power transistor and a second end coupled to the drain or the source of the power transistor, wherein when in a first phase the control switch is "off", the voltage on the drain of the power transistor is maintained at a predetermined value by the linear voltage-regulating switch, and when in a second phase the control switch is "on", the power transistor is "off";

a first switch, having a first end receiving an input voltage and a second end, wherein the first switch is "off" in the first phase, and "on" in the second phase;

a first capacitor, having a first end coupled to the drain of the power transistor and a second end coupled to the second end of the first switch;

a second switch, having a first end coupled to the second end of the first capacitor and a second end grounded, wherein the second switch is "on" in the first phase, and "off" in the second phase;

a third switch, having a first end coupled to the first end of the first capacitor and a second end, wherein the third switch is "off" in the first phase, and "on" in the second phase; and a second capacitor, having a first end coupled to the second end of the third switch and a second end grounded, wherein an output voltage is obtained from the first end of the second capacitor.

18. The charge pumping circuit as claimed in claim 17, wherein the linear voltage-regulating switch further comprises:
- an amplifier, having a first input end coupled to a feedback voltage, a second input end inputting a reference voltage, and an output end coupled to the gate of the power transistor, the amplifier comparing the feedback voltage and the reference voltage to control the gate of the power transistor, so as to maintain the voltage on the drain of the power transistor at the predetermined value, wherein the feedback voltage is equal to the voltage on the drain of the power transistor multiplied by a feedback ratio.

19. The charge bumping circuit as claimed in claim 18, wherein the linear voltage-regulating switch further comprises:
- a plurality of resistors connected in series, having one end coupled to the drain of the power transistor and the other end grounded, wherein the feedback voltage is obtained from any serial connection point of the resistors.

20. The charge pumping circuit as claimed in claim 18, wherein when the power transistor is a P-type transistor, the first input end of the amplifier is a positive-phase input end, and the second input end is a negative-phase input end.

21. The charge pumping circuit as claimed in claim 17, wherein the power circuit is applicable to a multi-power system.

* * * * *